Sept. 11, 1923.
R. RAFN
1,467,909
SHAKING APPARATUS FOR CANS CONTAINING CONDENSED MILK
Filed May 23, 1922
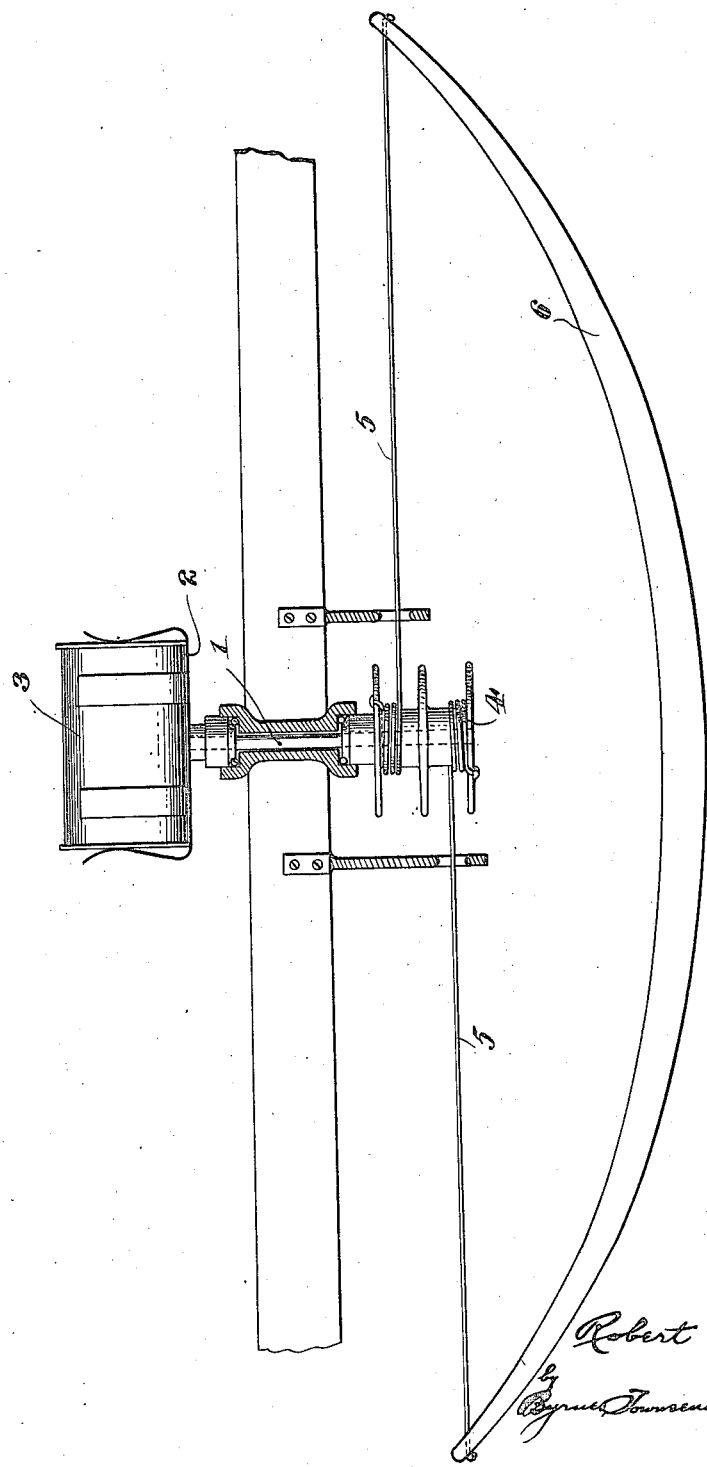
Inventor:
Robert Rafn,
by Byrnes Townsend & Brickenstein
attys.

Patented Sept. 11, 1923.

1,467,909

UNITED STATES PATENT OFFICE.

ROBERT RAFN, OF MOSS, NORWAY.

SHAKING APPARATUS FOR CANS CONTAINING CONDENSED MILK.

Application filed May 23, 1922. Serial No. 563,114.

*To all whom it may concern:*

Be it known that I, ROBERT RAFN, a subject of the King of Norway, residing at Moss, Norway, have invented certain new and useful Improvements in Shaking Apparatus for Cans Containing Condensed Milk; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is known that condensed and evaporated milk and similar products are liable to coagulate during the sterilizing process forming a more or less solid mass so as to make the product unsalable. If this mass is not too solid it is however possible to disturb the same by shaking so as to give the milk product an even liquid form.

A great variety of shaking apparatuses have been constructed for this purpose, the general principle of the shaking operation consisting in a rectilinear reciprocating movement of the can along the longitudinal axis of the same.

This method is generally sufficient so long as there is a small volume of air in the can, but if the can is practically filled the method is not sufficient to break up all lumps of coagulated product in the can.

The object of the present invention is to provide a method of and apparatus for breaking up the most solid coagulated lumps even if the can is completely filled and which will do this with a small consumption of power and without any extreme tension of machinery.

For this purpose the can is shaken by being rapidly rotated in opposite directions about the axis perpendicularly on the longitudinal axis of the can, the can being placed in a holder mounted on the top of a rotatable spindle, the axis of which intersects the longitudinal axis of the can substantially at the center of the same. By the rapid rotation in opposite directions the congealed milk is rapidly broken up and dissolved, a few strokes of the machine being sufficient to serve the purpose. The effects of this combined movement are the following:

When a sustained rotary movement is imparted to a can i. e. when a can is revolved a number of times about the transverse axis the corners and surfaces of the can being oblique to the direction of the centrifugal force will tend to impart the movement to the more or less congealed milk, and this movement progresses spirally inwards so that finally the whole contents of the can takes part in the rotating movement of the same. When the rotation is suddenly reversed the same process takes place in the opposite direction and with double the energy of the starting movement, and the movement is again gradually transferred to the center of the can.

In this manner each particle of the can's contents is forcibly disrupted from adjacent collecting particles, and even milk which has congealed in a mass of comparatively small lumps is evenly liquefied in the course of a few revolutions in both directions. This artificial disruption of the product can not probably be obtained otherwise. It is well known to shake the can by hand by imparting oscillations to the same, but these can probably not exceed 90° in each direction, and this is not sufficient for the rotary movement to be transmitted to the center of the can. Hand-shaken milk is therefore liable to contain a smaller or greater number of lumps.

On the drawing is illustrated a form of the invention.

On the top of a rotatably mounted spindle 1 is secured a basket or holder 2 adapted to grip a can 3 in the position illustrated and specified above. The lower end of the spindle is provided with two small pulleys 4 on each of which there is wound a narrow leather strap 5. One end of each leather strap is secured to the pulley and the opposite ends are secured to the ends of a bow or frame 6. The straps are wound in opposite directions about the respective pulleys and by gripping the bow with one hand and imparting to it a reciprocating movement, spindle 1 is given a rapid rotation alternately in opposite directions. By a pull of the bow away from the pulleys, the leather strap imparts rapid rotary movement to the shaft 1 and the can. The strap unwinds from the pulleys and due to the momentum of the rotating system is wound up in opposite direction until a balance is reached, the operator allowing the bow to return. Then another pull away from the pulley will revolve the system in opposite direction. The reversion of rotation at the end of a return movement of the bow can be made more abrupt by pulling away slightly before a balance is reached. The operation of the bow, the leather strap and the pulleys, as is well understood, thus brings about a sustained rapid rotation of the can first in one direction and then in the opposite direction. The frame or holder 2 may obviously be extended so as to grip more than one can at a time, but in order to obtain a rapid reversion and oscillation of movement it is important that the rotating parts of the apparatus should be as light as possible, and for that reason it is not desirable to treat a large number of cans simultaneously.

Although the above specified form of the invention comprises only a simple hand operated apparatus it will easily be understood by those skilled in the art that the apparatus may be adapted for mechanical operation and for co-operation with any well known automatical feeding- and exposing-mechanism for the cans without diverging from the principle of the invention as therein set forth.

Claims:

1. A method of treating condensed milk in sealed cans after the sterilizing process, which consists in subjecting a can to a sustained rotary movement alternately in opposite direction about an axis at an angle to the axis of the can.

2. A method of treating condensed milk in sealed cans after the sterilizing process, which consists in subjecting a can to a sustained rotary movement alternately in opposite direction about an axis substantially at right angle to the axis of the can.

3. In a shaking apparatus for cans containing condensed milk and the like the combination with a spindle of a holder mounted on the spindle and adapted for holding one or more cans with their longitudinal axis at right angles to the axis of the spindle, and means operative to impart a sustained rotary movement to the said spindle alternately in opposite directions.

In testimony that I claim the foregoing as my invention, I have signed my name in presence of two subscribing witnesses.

ROBERT RAFN.

Witnesses:
MAGERIS BRIGGE,
T. M. WALTERS.